United States Patent
Mu et al.

(10) Patent No.: US 6,939,260 B2
(45) Date of Patent: Sep. 6, 2005

(54) SILENT DRIVE CHAIN ASSEMBLY HAVING FLEXIBLE LINKS

(75) Inventors: Cheng Mu, Toronto (CA); David Mark Pascoe, Newmarket (CA); Jianwen Li, Toronto (CA)

(73) Assignee: Tesma International Inc., Concord (CA)

(*) Notice: Subject to any disclaimer, the term of this patent is extended or adjusted under 35 U.S.C. 154(b) by 147 days.

(21) Appl. No.: 10/413,873

(22) Filed: Apr. 15, 2003

(65) Prior Publication Data

US 2003/0216207 A1 Nov. 20, 2003

Related U.S. Application Data

(60) Provisional application No. 60/372,918, filed on Apr. 16, 2002.

(51) Int. Cl.[7] .............................................. F16G 13/00
(52) U.S. Cl. ....................................... 474/212; 474/206
(58) Field of Search .............................. 474/202, 206, 474/212, 213, 220, 226

(56) References Cited

U.S. PATENT DOCUMENTS 4,345,904 A * 8/1982 Numazawa et al. ........ 474/215
5,114,384 A * 5/1992 Tsuyama .................... 474/212
5,645,503 A * 7/1997 Okuda et al. ............... 474/214

* cited by examiner

Primary Examiner—David A. Bucci
Assistant Examiner—Vicky A. Johnson
(74) Attorney, Agent, or Firm—Clark Hill PLC

(57) ABSTRACT

A chain assembly drivingly engages a plurality of sprocket teeth that extend radially outwardly from a sprocket of an automobile drivetrain. The chain assembly includes a plurality of rigid links pivotally interconnected to each other to form an endless loop, wherein each of the plurality of rigid links includes a driving surface for drivingly engaging each of the plurality of sprocket teeth during rotation of the sprocket in a first driving direction. A plurality of flexible links are each operatively coupled to at least one of the plurality of rigid links for engaging each of the plurality of sprocket teeth prior to the driving engagement with the driving surface, wherein each of the plurality of flexible links are elastically deformable for dampening noise due to the driving engagement between the plurality of sprocket teeth and the plurality of rigid links.

10 Claims, 3 Drawing Sheets

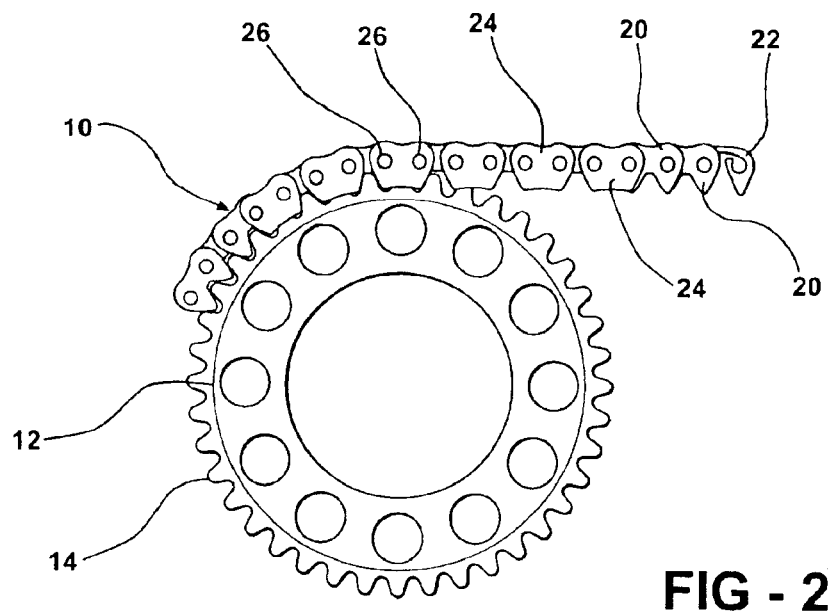
FIG - 2
FIG - 3
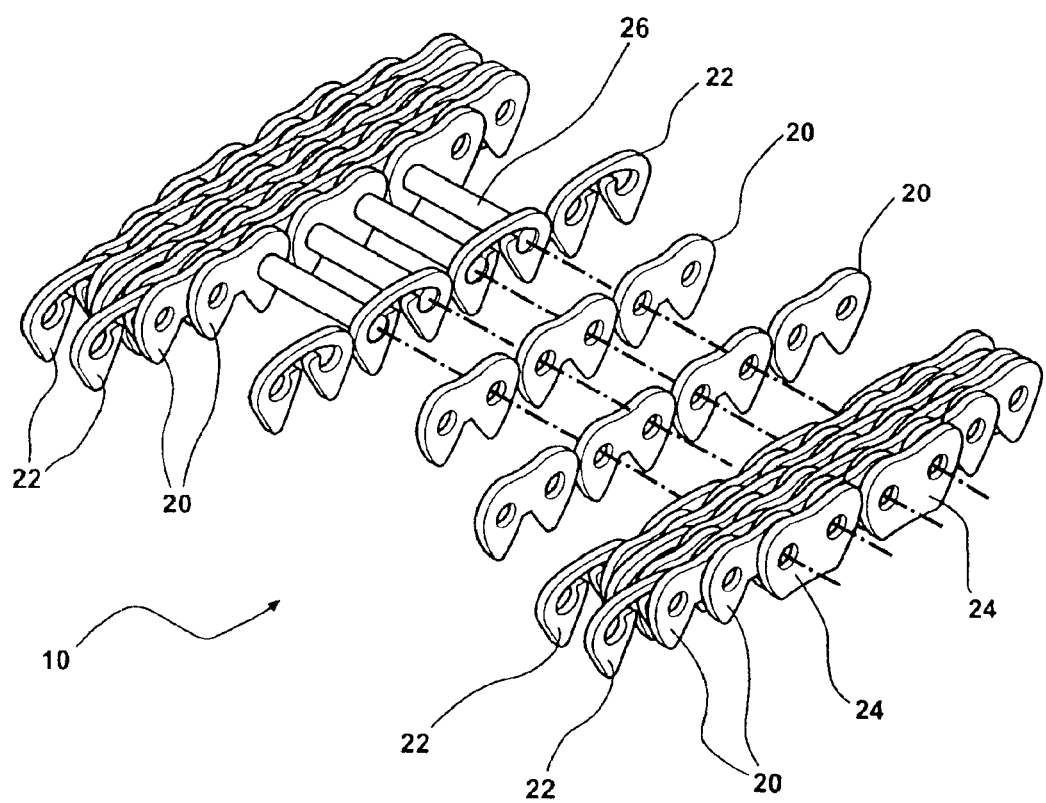

SILENT DRIVE CHAIN ASSEMBLY HAVING FLEXIBLE LINKS

CROSS REFERENCE TO RELATED APPLICATIONS

This application claims the benefit of U.S. Provisional Application Ser. No. 60/372,918 filed Apr. 16, 2002.

BACKGROUND OF THE INVENTION

1. Field of Invention

The invention relates to a chain assembly for engaging a sprocket in an automobile drivetrain. More particularly, the invention relates to flexible links within the chain assembly that dampen vibration and noise due to engagement of the chain assembly with the sprocket.

2. Description of the Related Art

Chains are widely used for drivingly engaging sprockets typically found in engine timing applications and transfer cases of automobiles. A chain includes a plurality of links pivotally interconnected in succession to form an endless loop. The plurality of links is typically manufactured in steel. It is appreciated that vibration and noise are produced by the engagement between the plurality of links and the sprockets. To address such vibration and noise, it is known to provide a chain having variable pitch, wherein the pitch length among the plurality of links is randomized. It is also known to provide a composite chain link assembly having inside and outside flanks, which function to break up or alter the natural frequency associated with the engagement between the plurality of links and the sprocket to dampen vibration and noise.

It remains desirable to provide a chain that is simple and cost effective to produce, while still dampening vibration and noise due to engagement of the chain and the sprocket.

SUMMARY OF THE INVENTION

According to one aspect of the invention, a chain assembly is provided for drivingly engaging a plurality of sprocket teeth extending radially outwardly from a sprocket of an automobile drivetrain. The chain assembly includes a plurality of rigid links pivotally interconnected to each other to form an endless loop, wherein each of the plurality of rigid links includes a driving surface for drivingly engaging each of the plurality of sprocket teeth during rotation of the sprocket in a first driving direction. A plurality of flexible links are each operatively coupled to at least one of the plurality of rigid links for engaging each of the plurality of sprocket teeth prior to the driving engagement with the driving surface, wherein each of the plurality of flexible links is elastically deformable for dampening noise due to the driving engagement between the plurality of sprocket teeth and the plurality of rigid links.

BRIEF DESCRIPTION OF THE DRAWINGS

Advantages of the present invention will be readily appreciated as the same becomes better understood by reference to the following detailed description when considered in connection with the accompanying drawings wherein:

FIG. 2 is a side view of a portion of the chain assembly drivingly engaged with a sprocket within the drivetrain;

FIG. 3 is a partially exploded, perspective view of the chain assembly;

DETAILED DESCRIPTION OF THE PREFERRED EMBODIMENT

Figure 1:
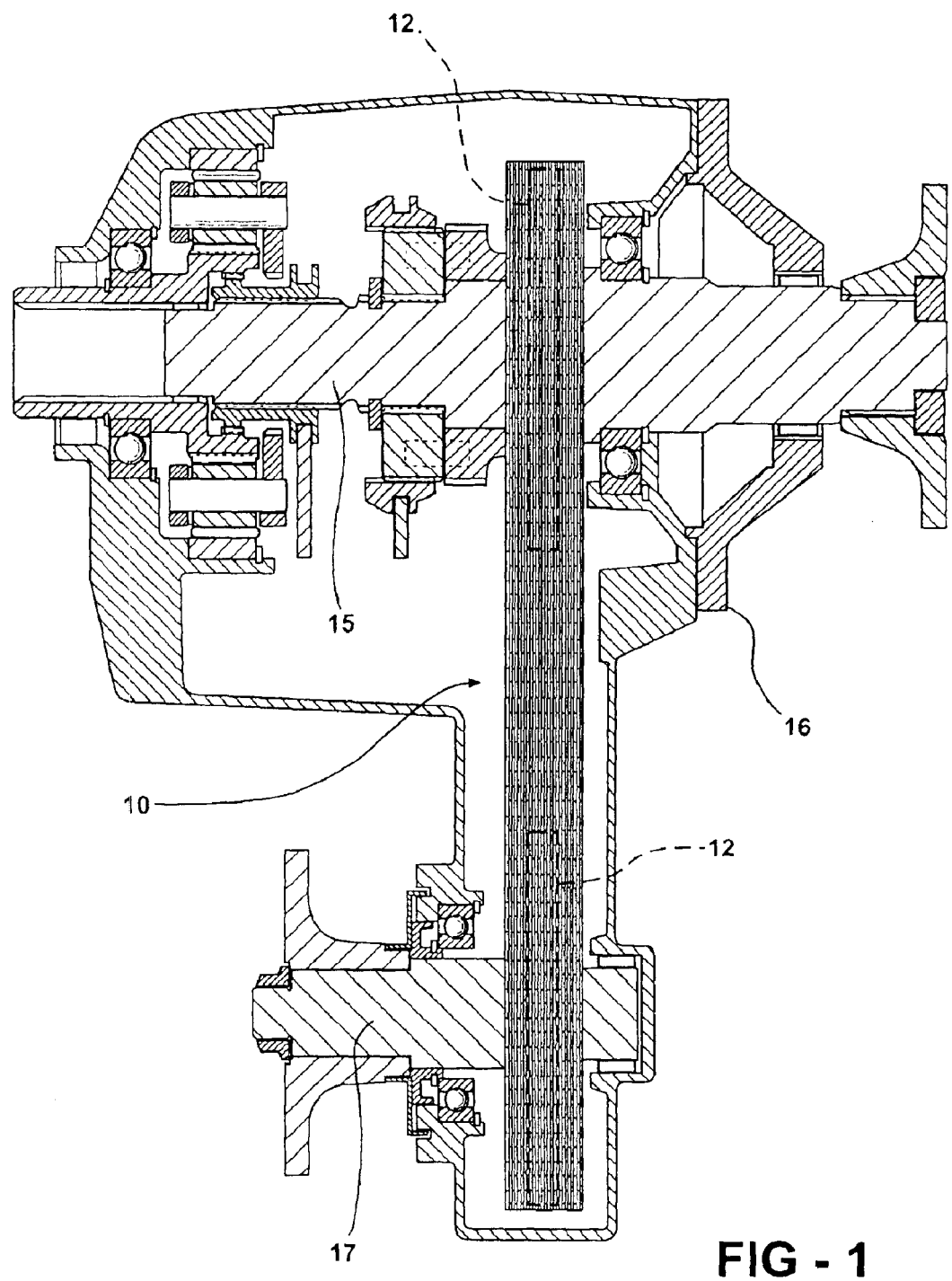
FIG. 1 is a cross-sectional side view of an automobile drivetrain incorporating a chain assembly according to the invention.
Figure 4:
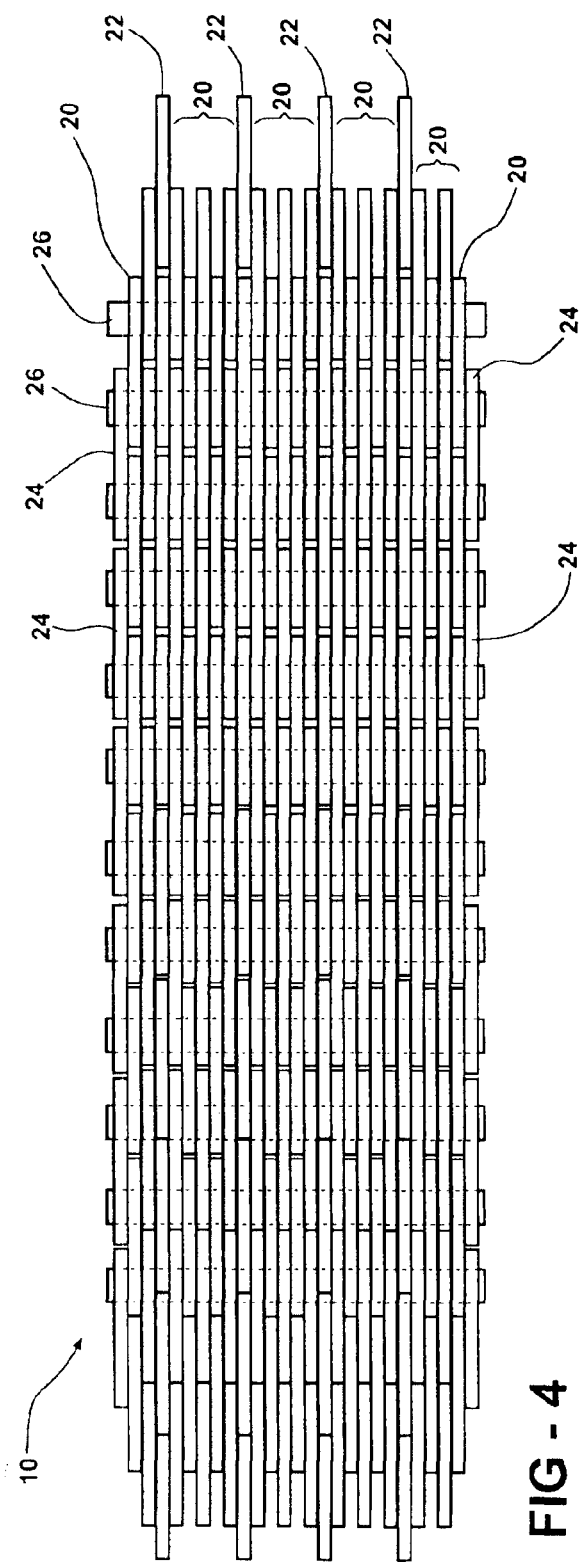
FIG. 4 is a top view of the chain assembly.

Referring to FIGS. 1 through 4, a chain assembly is generally indicated 10 for drivingly engaging a sprocket 12 of an automobile drivetrain 16. In FIG. 1, two sprockets 12 are each fixedly secured to input 15 and output 17 shafts of the drivetrain 16. The chain assembly 10 is wrapped around the sprockets 12 to transfer torque between the input 15 and output 17 shafts. Each of the sprockets 12 includes a plurality of sprocket teeth 14 and is rotatably mounted within the drivetrain 16 for rotation in either first or second driving directions.

The chain assembly 10 includes a plurality of rigid links 20, a plurality of flexible links 22 and a plurality of guide links 24. The plurality of rigid links 20 is pivotally interconnected to each other by a plurality of pins 26 to define at least one endless loop or row of rigid links 20. The plurality of flexible links 22 is coupled to the plurality of rigid links 20 by the plurality of pins 26 to define at least one row of flexible links 22. The plurality of guide links 24 is pivotally coupled to the plurality of pins 26 to define a row of guide links 24 for guiding the chain assembly 10 into driving engagement with the sprocket 12. Any number or combination of rows of rigid 20, flexible 22 and guide 24 links may be utilized depending on the application.

Figure 7:
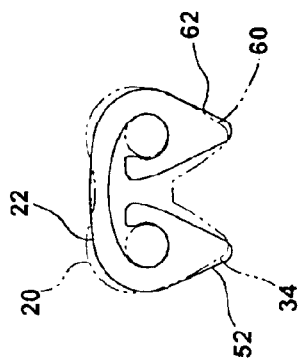
FIG. 7 is a side view of the flexible link with a rigid link shown in phantom overlapped.

Preferably, the chain assembly 10 will include two rows of rigid links 20 with a row of flexible links 22 sandwiched therebetween, such that each of the plurality of flexible links 22 is generally aligned with each of the plurality of rigid links 20. More specifically, two of the plurality of pins 26 that are used to connecting adjoining rigid links 20 together are used to align one of the plurality of flexible links 22 with each of the rigid links 20, as best shown in FIG. 7. The rows of rigid 20 and flexible 22 links are sandwiched between rows of guide links 16, such that each of the plurality of guide links 16 is generally aligned with at least one of the plurality of rigid links 20. The sprocket 12 is retained in engagement with the plurality of rigid 20 and flexible 22 links between the rows of guide links 24, because each row of guide link 24 is spaced from each other a distance slightly greater than the width of the sprocket teeth 24.

Figure 5:
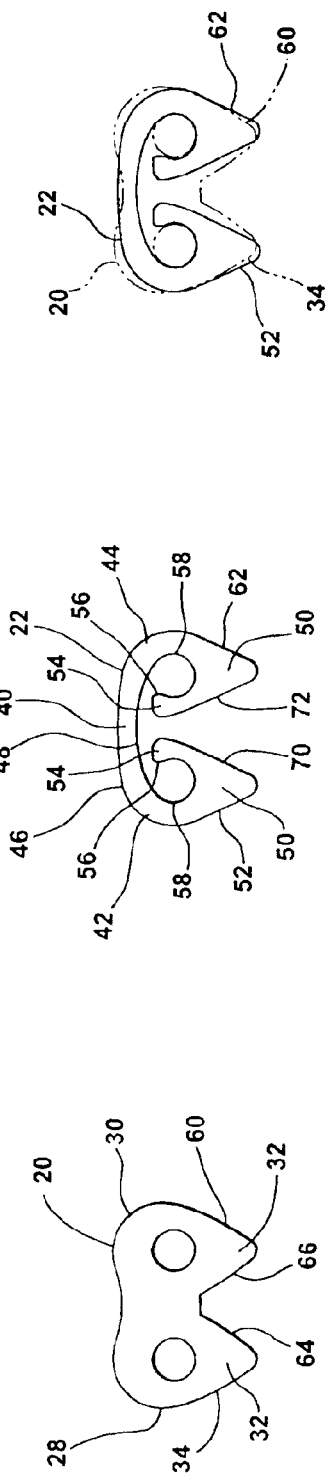
FIG. 5 is a side view of a rigid link within the chain assembly.

Referring to FIGS. 5 and 7, each of the plurality of rigid links 20 extends between fore 28 and aft 30 ends. A contact tooth 32 extends from at least one of, but preferably from both of the fore 28 and aft 30 ends. A driving surface 34 is defined by the contact tooth 32 for drivingly engaging the plurality of sprocket teeth 14 during rotation of the sprockets 12 in the first driving direction.

Figure 6:
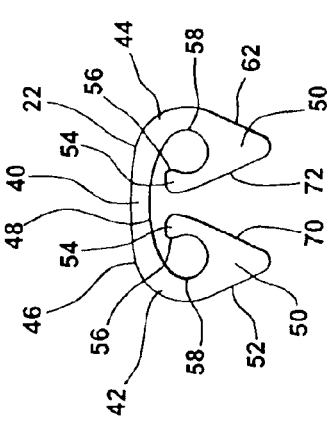
FIG. 6 is a side view of a flexible link within the chain assembly.

Referring to FIGS. 6 and 7, each of the plurality of flexible links 22 includes a bridge 40 that extends between primary 42 and secondary 44 ends. The bridge 40 is elastically deformable to allow momentary displacement, either axial elongation or angular, of the primary 42 and secondary 44 ends with respect to each other. The bridge 40 includes upper 46 and lower 48 edges each extending between the primary 42 and secondary 44 ends of the bridge 40. A dampening tooth 50 extends outwardly from at least one, but preferably both of the primary 42 and secondary 44 ends of the bridge 40. At least one of the dampening teeth 50 includes a dampening surface 52 that is engagable in the first driving direction with the plurality of sprocket teeth 14 prior to the driving engagement with the driving surface 34. More specifically, when the pluralities of rigid 20 and flexible 22 links are positioned by the pins 26, the dampening surfaces 52 extend out beyond the driving surfaces 34 such that the sprocket teeth 14 engage the dampening surfaces 52 prior to the driving surfaces 34.

The dampening surface 52 is displaced relative to the driving surface 34 upon contact with the plurality of sprocket teeth 14 due to elastic deformation of the bridge 40 and the dampening tooth 50. The displacement of the dampening surface 52 relative to the driving surface 34 is a compression that dampens the contact between the plurality of sprocket teeth 14 and the driving surface 34, thereby dampening noise associated with the driving engagement of the sprocket 12 and the plurality of rigid links 20. Therefore, the force absorbed by the flexible link 22 dampens the impact force imparted on the driving surface 34 of the contact tooth 32.

Each dampening tooth 50 includes a hooked portion 54 having a distal end 46. The hooked portion 54 includes an arcuate edge 58 that extends between the distal end 46 and the lower edge 48 of the bridge 40 to define a pin aperture 50 for receiving one of the plurality of pins 26 therethrough. Alternatively, a hole may be formed in each dampening tooth 50 or in each of the primary 42 and secondary 44 ends of the bridge 40 for pivotally receiving one of the plurality of pins 26 therethrough.

Referring to FIGS. 5, 6 and 7, the contact tooth 32 of each of the plurality of rigid links 20 defines a complementary driving surface 60 that is generally opposite the driving surface 34. The complementary driving surface 60 drivingly engages the plurality of sprocket teeth 14 during rotation of the sprocket 12 in the second driving direction opposite the first driving direction. Similarly, each of the plurality of flexible links 22 includes a complementary dampening surface 62 formed in at least one of the dampening teeth 50 generally opposite the dampening surface 52. The complementary dampening surface 62 is engagable in the second driving direction with each of the plurality of sprocket teeth 14 prior to the driving engagement with the complementary driving surface 60. The complementary dampening surface 62 is displaced with respect to the complementary driving surface 60 due to elastic deformation of the bridge 30 and the dampening tooth 50. The elastic deformation of the complementary dampening surface 62 relative to the complementary driving surface 60 dampens contact between plurality of sprocket teeth 14 and the complementary driving surface 60, thereby dampening noise associated with the driving engagement between the sprocket 12 and the plurality of rigid links 20.

An inner driving surface 64 is defined by the contact tooth 32 for receiving a driving force in the first driving direction from each of the plurality of sprocket teeth 14. The inner driving surface 64 is disposed adjacent to the driving surface 34. Similarly, a complementary inner driving surface 66 is defined by the contact tooth 32 for receiving the driving force in the second driving direction from each of the plurality of sprocket teeth 14. Likewise, the inner complementary inner driving surface 66 is disposed adjacent the complementary driving surface 60. Inner 70 and complementary inner 72 surfaces are defined by the dampening tooth 50 and correspond to the inner 64 and complementary inner 66 driving surfaces, respectively. Each of the inner 70 and complementary inner 72 surfaces may be adapted to engage the plurality of sprocket teeth 14 prior to the driving engagement with the driving 34 and complementary driving 60 surfaces, respectively, to cause elastic deformation of the bridge 30 and the dampening tooth 50 and, thereby, dampen noise generated by engagement between the sprocket 12 and the plurality of rigid links 20.

The invention has been described in an illustrative manner, and it is to be understood that the terminology, which has been used is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A chain assembly for drivingly engaging a plurality of sprocket teeth extending radially outwardly from a sprocket of an automobile drivetrain, said chain assembly comprising:

a plurality of rigid links pivotally interconnected to each other to form an endless loop, wherein each of said plurality of rigid links includes a driving surface for drivingly engaging each of the plurality of sprocket teeth during rotation of the sprocket in a first driving direction;

a plurality of flexible links each operatively coupled to at least one of said plurality of rigid links for engaging each of said plurality of sprocket teeth prior to said driving engagement with said driving surface, wherein each of said plurality of flexible links are elastically deformable for dampening noise due to said driving engagement between the plurality of sprocket teeth and said plurality of rigid links, each of said flexible links including a bridge extending between primary and secondary ends and upper and lower edges extending longitudinally between said primary and secondary ends wherein said bridge is elastically deformable to allow displacement of said primary and secondary ends with respect to each other, each of said flexible links further including at least one dampening tooth extending outwardly from one of said primary and secondary ends, said dampening tooth including a dampening surface engagable in said first driving direction with the plurality of sprocket teeth prior to said driving engagement with said driving surface, wherein said dampening surface is displaced with respect to said driving surface due to elastic deformation of said bridge and said dampening tooth for dampening noise associated with said driving engagement; and a plurality of pins for pivotally interconnecting said plurality of rigid links and said plurality of flexible links to form an endless loop; wherein each of said plurality of flexible links includes a hooked portion pivotally engaged with one of said plurality of pins and including a distal end.

2. A chain assembly as set forth in claim 1 wherein each of said plurality of flexible links includes an arcuate edge extending between said distal end of said hooked portion and said lower edge of said bridge to define a pin aperture for pivotally receiving one of said plurality of pins therethrough.

3. A chain assembly as set forth in claim 2 wherein each of said plurality of rigid links includes a complementary driving surface for drivingly engaging the plurality of sprocket teeth during rotation of the sprocket in a second driving direction opposite said first driving direction.

4. A chain assembly as set forth in claim 3 wherein said dampening tooth of each of said plurality of flexible links includes a complementary dampening surface engagable in said second driving direction with each of the plurality of sprocket teeth prior to said driving engagement with said complementary surface, wherein said complementary dampening surface is displaced with respect to said complementary surface due to elastic deformation of said bridge and said dampening tooth for dampening noise associated with said driving engagement.

5. A chain assembly as set forth in claim 4 including a plurality of guide links pivotally interconnected to each of said plurality of pins to guide said chain assembly into driving engagement with the sprocket in either of said first and second driving directions.

6. A flexible link for use with a chain assembly having a plurality of rigid links pivotally interconnected to each other by a plurality of pins, wherein each of the plurality of rigid links includes a driving surface for drivingly engaging a plurality of teeth of a rotatable sprocket, said flexible link comprising:

a bridge extending between primary and secondary ends and upper and lower edges extending longitudinally between said primary and secondary ends wherein said bridge is flexible to allow elastic displacement of said primary and secondary ends relative to each other; and a dampening tooth extending outwardly from at least one of said primary and second ends for engaging the plurality of teeth prior to the driving engagement with the driving surface, whereby said flexible link is elastically deformed to dampen noise generated by the sprocket teeth engaging each of said plurality of rigid links, said dampening tooth further including a dampening surface spaced apart from the drive surface for engaging the plurality of teeth prior to driving engagement with the driving surface, wherein said dampening surface is displaced with respect to the driving surface due to elastic deformation of said bridge and said dampening tooth for dampening noise associated with said driving engagement; and wherein said each of said plurality of flexible links includes a hook portion pivotally engaged with one of said plurality of pins and including a distal end.

7. A flexible link as set forth in claim 6 including an aperture for receiving one of the plurality of pins therethrough, whereby said flexible link is coupled to at least one of the plurality of rigid links.

8. A chain assembly for drivingly engaging a plurality of sprocket teeth extending radially outwardly from a sprocket of an automobile drivetrain, said chain assembly comprising:

a plurality of rigid links, each of said plurality of rigid links extending between fore and aft ends and having a contact tooth extending out from said fore end, said contact tooth defining a driving surface to engage the sprocket teeth, each of said fore and aft ends including a hole;

a plurality of pins pivotally securing one of said fore ends of one of said plurality of links to one of said aft ends of another of said plurality of links allowing said plurality of links to be interconnected to form an endless loop; and a plurality of flexible links each extending between primary and secondary ends and having a dampening tooth defining a dampening surface spaced apart from said driving surface of one of said plurality of rigid links such that said dampening surface engages the sprocket teeth immediately prior said driving surface and elastically deforms to dampen noise generated by the sprocket teeth engaging each of said plurality of rigid links; wherein each of said flexible links includes a bridge having upper and lower edges extending longitudinally between said primary and second ends of said bridge such that said bridge is elastically deformable to allow displacement of said primary and second ends with respect to each other and said dampening tooth extends outwardly from one of said primary and secondary ends for engaging in said first driving direction the plurality of sprocket teeth prior to said driving engagement with said driving surface, said dampening surface displaced with respect to said driving surface due to elastic deformation of said bridge and said dampening tooth for dampening noise associated with said driving engagement; and wherein each of said plurality of flexible links includes a hooked portion pivotally engaged with one of said plurality of pins, said hooked portion including a distal end.

9. A chain assembly as set forth in claim 8 wherein each of said plurality of flexible links includes an arcuate edge extending between said distal end of said hooked portion and said lower edge of said bridge to define a pin aperture for pivotally receiving one of said plurality of pins therethrough.

10. A chain assembly as set forth in claim 9 wherein each of said plurality of rigid links includes a complementary driving surface for drivingly engaging the plurality of sprocket teeth during rotation of the sprocket in a second driving direction opposite said first driving direction.

* * * * *